T. L. McKEEN.
FRICTION DRAFT GEAR.
APPLICATION FILED JAN. 21, 1909.
943,314.
Patented Dec. 14, 1909.
2 SHEETS—SHEET 1.
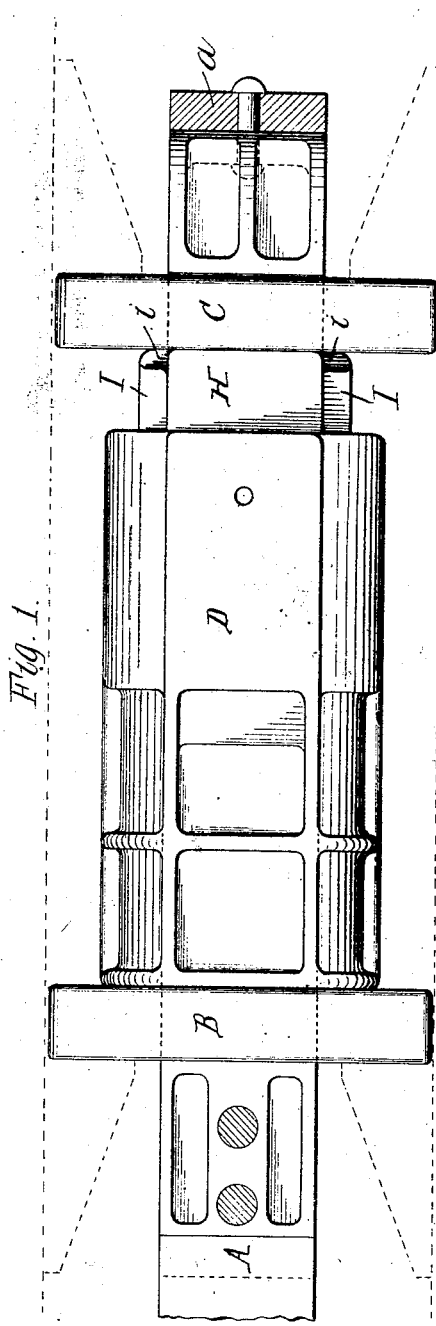
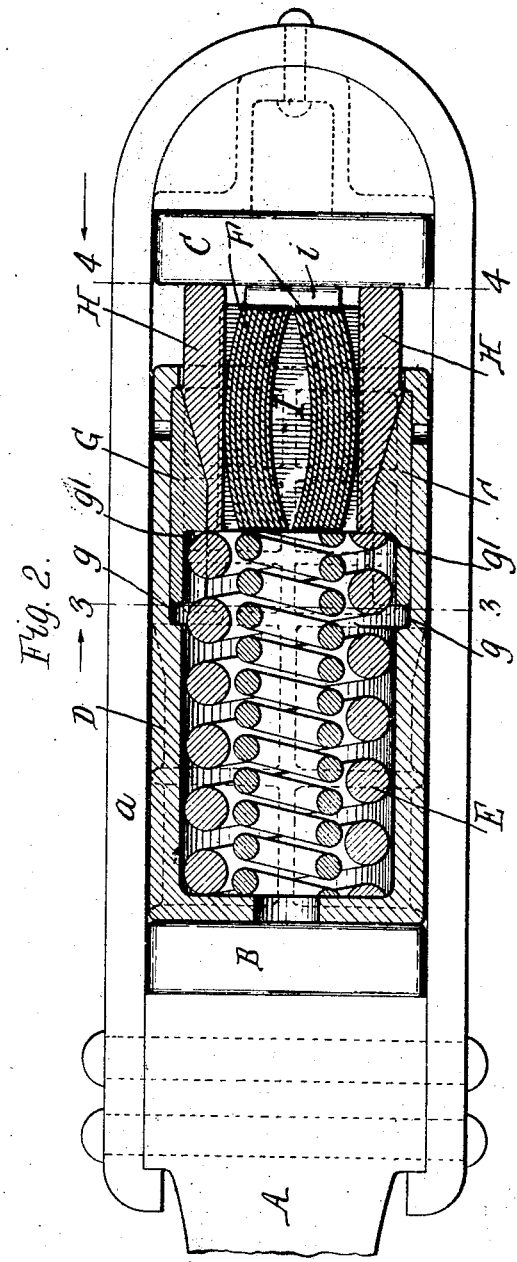
Witnesses:
Inventor.
Attorneys.

T. L. McKEEN.
FRICTION DRAFT GEAR.
APPLICATION FILED JAN. 21, 1909.

943,314.

Patented Dec. 14, 1909.
2 SHEETS—SHEET 2.

Witnesses:
A. G. Dimond.
E. A. Volk

Inventor:
Thomas L. McKeen,
By Wilhelm, Parker & Hurd,
Attorneys.

UNITED STATES PATENT OFFICE.

THOMAS L. McKEEN, OF SCRANTON, PENNSYLVANIA.

FRICTION DRAFT-GEAR.

943,314.      Specification of Letters Patent.      Patented Dec. 14, 1909.

Application filed January 21, 1909.   Serial No. 473,488.

*To all whom it may concern:*

Be it known that I, THOMAS L. McKEEN, a citizen of the United States, residing at Scranton, in the county of Lackawanna and State of Pennsylvania, have invented a new and useful Improvement in Friction Draft-Gears, of which the following is a specification.

This invention relates more particularly to improvements in that type of friction draft and buffing gears for railway cars which is disclosed in U. S. Letters Patent No. 761,534, granted to me May 31, 1904. The said patented gear comprises a coil spring and longitudinally movable leaf springs which extend lengthwise of the gear at one end of the coil spring and exert their pressure laterally on friction devices which are located at opposite sides thereof and coöperate with the coil spring to yieldingly resist or cushion the movements of the drawbar in opposite directions.

The principal object of the invention is to simplify and cheapen gears of this sort and improve the construction thereof so as to reduce the number of parts and make the gear more compact, thereby adapting it for application to cars in which the center or draft sills are located too close together to admit of the use of the gear as formerly constructed.

Other objects of the invention are to give the drawbar an increased travel opposed by frictional and spring resistance as distinguished from purely spring resistance; also to do away with a center follower and provide means for holding the leaf springs in place and reducing the wear on the coil spring and the end follower; and to improve the gear in the other respects hereinafter described and set forth in the claims.

Figure 3:
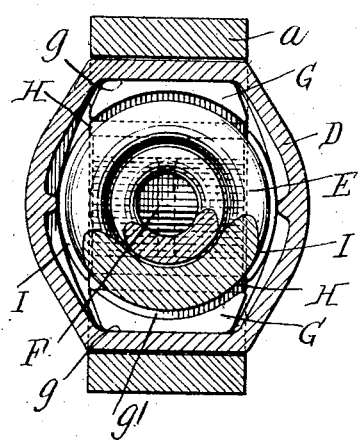
Figure 4:
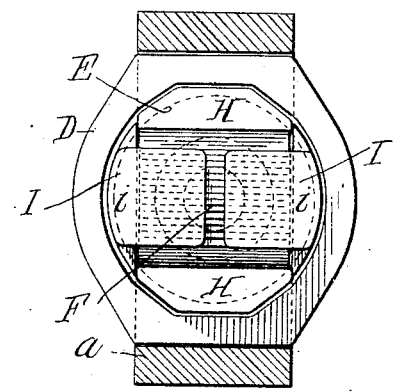
Figure 5:
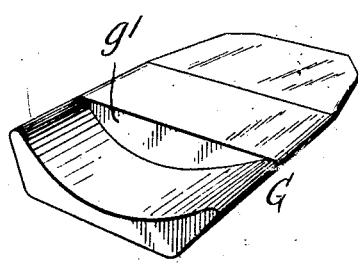
Figure 6:
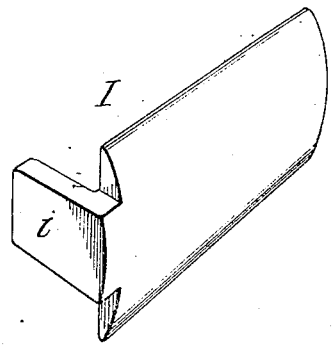

In the accompanying drawings, consisting of two sheets: Figure 1 is a plan view partially in section of a friction draft and buffing gear embodying the invention. Fig. 2 is a central longitudinal sectional elevation thereof. Figs. 3 and 4 are transverse sectional elevations thereof in lines 3—3 and 4—4, respectively, Fig. 2, looking in the directions of the arrows in said figure. Fig. 5 is a perspective view of one of the friction blocks detached. Fig. 6 is a perspective view of one of the filler plates detached.

Like letters of reference refer to like parts in the several figures.

A represents the inner end of a drawbar, $a$ the usual yoke or loop secured thereto, B and C the usual front and rear or outer and inner followers which extend loosely through the yoke and are adapted to coöperate with the usual stops on the draft or center sills, and D a movable barrel or case which is arranged in the yoke between the followers. One end of the barrel is preferably closed and bears against one of the followers, for instance, the front follower B.

E represents a standard coil spring, preferably consisting of inner and outer coils, arranged in the closed end of the barrel; and F represents bowed leaf springs or spring plates arranged lengthwise of the gear centrally in the open end of the barrel, at one end of the coil spring.

G represents friction blocks or wedge plates arranged in the barrel at the open end thereof opposite the leaf springs, and H represents wedges arranged between these friction blocks and the leaf springs, with their outer ends engaging the adjacent follower and having inclined faces which are pressed by the leaf springs against coöperating inclined faces on the friction blocks.

The above mentioned parts are all found in said patented gear, but in the present gear the leaf springs are preferably arranged horizontally, instead of vertically on edge, so that they are compressed vertically, and are divided into opposite sets having the convex sides of both sets turned outwardly or away from each other and bearing centrally against the inner faces of the wedges which are located above and below them, which arrangement enables a narrower barrel to be used. No central follower is used, and the inner ends both of the leaf springs and of the wedges bear directly against the coil spring. The friction blocks G have a limited longitudinal movement in the barrel against flat internal friction faces $g$ on the barrel, and they are provided with shoulders g' which also bear against the same end of the coil spring as the leaf springs and wedges.

I represents filler plates which are arranged in the open end of the barrel at opposite sides of the leaf springs with their upper and lower edges overlapping the wedges H. These filler plates are of segmental cylindrical cross-section, substantially filling the spaces in the barrel in which they are located, and they have bearing pieces i at their outer ends which project toward each other between the outer ends of the leaf springs and the adjacent followers C. The inner ends of the filler plates bear against the coil spring E. These filler plates perform several functions. They hold the leaf springs in place, preventing lateral displacement thereof, and as their bearing pieces i bear directly against the outer ends of the leaf springs the wear falls on these bearing pieces and not on the follower C. As the inner ends of the filler plates bear on the coil spring they transmit the pressure directly from the follower C to the coil spring, thereby relieving the wedges of a part of this pressure and consequently reducing the wear between the outer ends of the wedges and the follower when the wedges are moved transversely toward and from each other in the operation of the gear. As the filler plates I and wedges H bear against the coil spring and are preferably slightly longer than the leaf springs when expanded, they also materially reduce the wear between the engaging ends of the coil and leaf springs. In assembling the gear the filler pieces project somewhat beyond the ends of the wedges and cause a sufficient compression of the springs in placing the parts in the yoke to hold the several parts in contact and prevent objectionable looseness or play thereof.

The operation of the gear is as follows: When the drawbar is pulled forwardly under draft, the front follower B and barrel D are held stationary by the follower stops and the rear follower C is moved by the yoke, forcing the wedges H, filler plates I and leaf springs F into the barrel. The wedges also force the friction blocks G inwardly and their inward movement is resisted by the coil spring E, against which the friction blocks bear, and also by the friction between the friction blocks G and the faces of the barrel against which they bear. In the continued movement of the wedges, they are forced laterally toward each other by the coöperating inclined faces of the friction blocks and wedges, and compress or strain the leaf springs, thus adding to the resistance mentioned, that due to the leaf springs and friction between the inclined faces of the wedges and friction blocks. When the drawbar is shoved rearwardly in buffing, the front follower and barrel move with the drawbar and the rear follower is held stationary by its stops, and the spring and friction devices act, as above described, to resist the movement of the drawbar.

I claim as my invention:

1. The combination of a barrel, friction blocks which are slidable longitudinally in said barrel, a coil spring in said barrel which resists the movement of said friction blocks, wedges which extend into said barrel and have inclined faces bearing against inclined faces on said friction blocks, leaf springs which are arranged lengthwise between said wedges and press said wedges against said friction blocks, said friction blocks, wedges and leaf springs all bearing directly against one end of said coil spring, and means for causing a relative longitudinal movement between said barrel and said wedges, substantially as set forth.

2. The combination of a barrel, friction blocks in said barrel, a coil spring in said barrel, wedges which are located in said barrel and have inclined faces bearing against inclined faces on said friction blocks, leaf springs which are arranged lengthwise between said wedges and press said wedges against said friction blocks, filler plates in said barrel at opposite sides of said leaf springs, said wedges, leaf springs and filler plates all bearing against one end of said coil spring, and means for causing a relative longitudinal movement between said barrel and said wedges, leaf springs and filler plates, substantially as set forth.

3. The combination of a drawbar, a barrel adapted to remain stationary when the drawbar is moved in one direction, a follower which is movable with the drawbar, friction blocks in said barrel, a coil spring in said barrel, wedges which bear at their ends against said follower and have inclined faces which bear against inclined faces on said friction blocks, leaf springs which are arranged lengthwise between said wedges and press said wedges against said friction blocks, and filler plates in said barrel at opposite sides of said leaf springs and having bearing pieces located between the ends of said leaf springs and said follower, said wedges, leaf springs and filler plates being movable with said follower, and said filler plates acting to transmit pressure from said follower to said coil spring, substantially as set forth.

4. The combination of a drawbar, a barrel and a follower, each of which moves in one direction with the drawbar and is held from movement when the drawbar is moved in the opposite direction, a coil spring in said barrel, wedges which bear at opposite ends against said follower and said coil spring and have inclined faces which bear against coöperating inclined faces located in said barrel, leaf springs which are arranged lengthwise between said wedges and press said wedges against said inclined faces in the barrel, and filler plates which are arranged in said barrel at opposite sides of said leaf springs and bear at opposite ends against said follower and said coil spring and have bearing pieces arranged between said follower and the adjacent ends of said leaf springs, substantially as set forth.

Witness my hand, this 19th day of January, 1909.

THOMAS L. McKEEN

Witnesses:
C. W. PARKER,
C. B. HORNBECK.